United States Patent
Nakai et al.

(10) Patent No.: US 7,208,903 B2
(45) Date of Patent: Apr. 24, 2007

(54) CONTROL DEVICE FOR ALTERNATING-CURRENT MOTOR

(75) Inventors: Hideo Nakai, Nisshin (JP); Hiroki Ohtani, Aichi-ken (JP); Yukio Inaguma, Nagoya (JP); Katsuhiro Asano, Toyoake (JP); Hideto Hanada, Yokohama (JP); Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/443,365

(22) Filed: May 31, 2006

(65) Prior Publication Data

US 2006/0214625 A1    Sep. 28, 2006

Related U.S. Application Data

(62) Division of application No. 11/203,175, filed on Aug. 15, 2005, now Pat. No. 7,078,874.

(30) Foreign Application Priority Data

Sep. 26, 2004    (JP) .............................. 2004-259073

(51) Int. Cl.
G05B 11/36    (2006.01)
H02P 6/10    (2006.01)

(52) U.S. Cl. ...................... 318/609; 318/629; 318/632

(58) Field of Classification Search ................ 318/138, 318/254, 439, 568.19, 609, 610, 621, 623, 318/629, 632, 720–724

See application file for complete search history.

(56) References Cited

U.S. PATENT DOCUMENTS

| | | | |
|---|---|---|---|
| 4,499,413 A | 2/1985 | Izosimov et al. | |
| 4,763,058 A | 8/1988 | Heining et al. | |
| 4,808,903 A * | 2/1989 | Matsui et al. | 318/800 |
| 5,694,017 A * | 12/1997 | Lansberry | 318/809 |
| 5,936,377 A | 8/1999 | Blaschke et al. | |
| 6,078,199 A * | 6/2000 | Satoh et al. | 310/90.5 |
| 6,212,540 B1 * | 4/2001 | Murakami et al. | 708/819 |
| 6,229,719 B1 * | 5/2001 | Sakai et al. | 363/37 |
| 6,639,380 B2 | 10/2003 | Sul et al. | |
| 6,741,063 B2 * | 5/2004 | Sakai et al. | 318/809 |
| 6,801,011 B2 | 10/2004 | Ide | |

FOREIGN PATENT DOCUMENTS

| | | |
|---|---|---|
| EP | 1 292 011 A2 | 3/2003 |
| JP | A 2002-223600 | 8/2002 |
| JP | A 2003-164198 | 6/2003 |
| JP | A 2004-23804 | 1/2004 |

* cited by examiner

Primary Examiner—Bentsu Ro
(74) Attorney, Agent, or Firm—Oliff & Berridge, PLC

(57) ABSTRACT

In one coordinate system of arbitrary rectangular coordinate systems including a coordinate system in which the position of a stator is fixed, a coordinate system in which the position of a rotor is fixed, and a coordinate system which rotates at a rotational frequency which is n times (n is an integer which is not 0 or 1) that of the rotor, a filter on any other coordinate system is defined. Further, driving of a motor is controlled by utilizing this filter. As a result, a coordinate transformation operation need not be individually performed with respect to control variables.

6 Claims, 9 Drawing Sheets

CONTROL DEVICE FOR ALTERNATING-CURRENT MOTOR

This is a Divisional of application Ser. No. 11/203,175 filed Aug. 15, 2005 now U.S. Pat. No. 7,078,874. The disclosure of the prior application is hereby incorporated by reference herein in its entirety.

BACKGROUND OF THE INVENTION

1. Field of the Invention

The present invention relates to control over a driving current which is supplied to an alternating-current motor including a rotor and a stator.

2. Description of the Related Art

A typical driving current supplied to a three phase alternating-current motor including a rotor and a stator is a current having three phases of iu, iv and iw. This three-phase driving current is controlled based on an output torque command from the motor. In a heretofore common technique for controlling such a motor, a current having respective phases (the respective phases of u, v and w) is converted into currents of d and q axis coordinate systems of an exciting current axis (a d axis) and a torque current axis (a q axis), and each converted axis current is controlled to match with an axis command value obtained from a torque command of the motor.

Such control assumes that a motor driving current basically conforms to a sine wave, and such control is directed at this fundamental wave component only. However, in reality, a magnetic flux generated in accordance with a motor driving current is distorted, or a higher harmonic component is generated in a motor driving current due to various situations such as characteristics at the time of inverter switching or the like.

Therefore, in order to perform further accurate control, control must be carried out taking a higher harmonic component into consideration.

As a control method for a higher harmonic current as a frequency component n times that of a fundamental wave component, there has been proposed preparation of a coordinate system by which a current can be processed as a direct current with respect to all current components as control targets and execution of control over a current transformed on the coordinate system and a command value (See, for example, Japanese Patent Application Laid-open No. 2002-223600).

However, in the above-described art, control over a higher harmonic current component is executed on a coordinate system for the higher harmonic current component. Therefore, after performing coordinate transformation from three phases of u, v and w (an αβ phase: a coordinate system with a stator fixed) into an axis coordinate system or the like, control or the like is performed, and an output obtained by this control is again subjected to reverse coordinate transformation. Therefore, because many coordinate transformation operations must be carried out, calculations are undesirably complicated.

SUMMARY OF THE INVENTION

According to the present invention, a higher harmonic component can be also controlled. Therefore, a higher harmonic wave contained in a motor driving current can be suppressed, and a copper loss can be thereby reduced. Further, by applying an appropriate higher harmonic current to a higher harmonic component contained a magnet, an increase in an output torque can be expected. Furthermore, because control over any coordinate axis can be executed on a single coordinate axis, a coordinate transformation operation need not be performed each time, thereby effectively executing control. For example, PI control over a higher harmonic current which is n times the rotational frequency of a rotor can be executed in a dq axis coordinate system in which the position of the rotor is fixed, or PI control over a dq current in the dq axis coordinate system with the rotor fixed can be executed on an αβ coordinate system in which the position of the stator is fixed.

DETAILED DESCRIPTION OF THE PREFERRED EMBODIMENT

Figure 1:
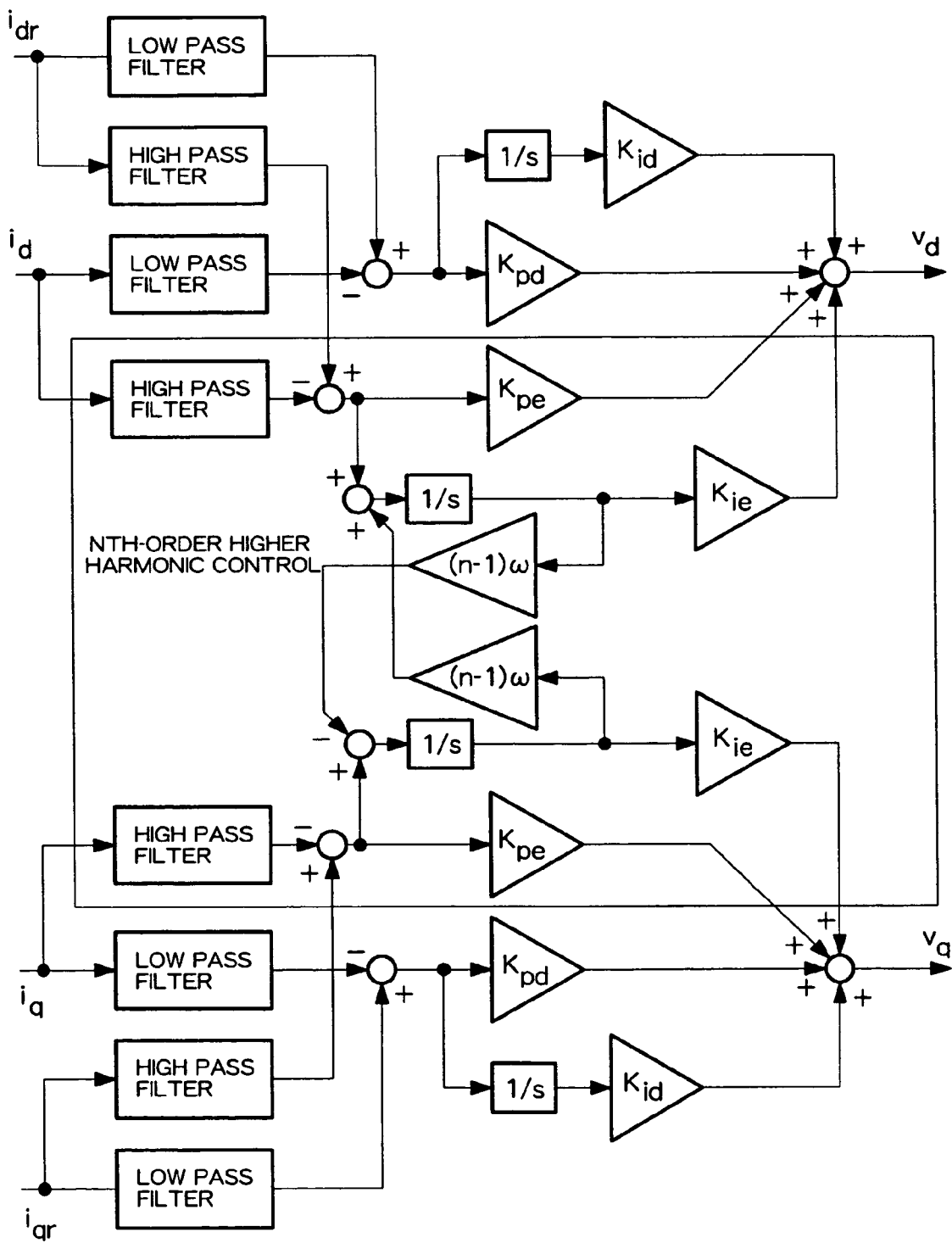
FIG. 1 is a view showing a configuration in a dq axis coordinate system for PI control over an nth-order higher harmonic wave.

A preferred embodiment of the present invention will be described hereinafter.

"Coordinate System"

An example will be considered of a rotor which rotates at a fixed angular velocity ω and a rotation angle θ. An αβ coordinate system in which the position of a stator is fixed, a dq axis coordinate system in which the position of a is rotor fixed, and an ef axis coordinate system rotating at a rotational velocity which is n times that of the rotor will be introduced.

Respective state quantities (column vectors) ($x_\alpha$, $x_\beta$), ($x_d$, $x_q$), ($x_e$, $x_f$) on the αβ coordinate system, the dq axis coordinate system and the ef axis coordinate system have the following relationship through a transformation matrix T(θ).

$$\begin{pmatrix} x_d \\ x_q \end{pmatrix} = T(\theta) \begin{pmatrix} x_\alpha \\ x_\beta \end{pmatrix} \quad (1)$$

$$\begin{pmatrix} x_e \\ x_f \end{pmatrix} = T(n\theta) \begin{pmatrix} x_\alpha \\ x_\beta \end{pmatrix} \quad (2)$$

$$T(n\theta) = \begin{pmatrix} \cos n\theta & \sin n\theta \\ -\sin n\theta & \cos n\theta \end{pmatrix} \quad (3)$$

PI control in each coordinate system will now be prepared as follows. It is to be noted that Kp is a constant for proportional control and Ki is a constant for integration control. Furthermore, a suffix r denotes a target value. Moreover, in the description of this specification, same fonts may be used to denote scalars, vectors and matrices.

(α–β Coordinate System)

$$\begin{pmatrix} v_\alpha \\ v_\beta \end{pmatrix} = \begin{pmatrix} K_{p\alpha} & 0 \\ 0 & K_{p\beta} \end{pmatrix} \left\{ \begin{pmatrix} i_{\alpha r} \\ i_{\beta r} \end{pmatrix} - \begin{pmatrix} i_\alpha \\ i_\beta \end{pmatrix} \right\} + \begin{pmatrix} K_{i\alpha} & 0 \\ 0 & K_{i\beta} \end{pmatrix} \begin{pmatrix} e_\alpha \\ e_\beta \end{pmatrix} \quad (4)$$

$$\frac{d}{dt}\begin{pmatrix} e_\alpha \\ e_\beta \end{pmatrix} = \begin{pmatrix} i_{\alpha r} \\ i_{\beta r} \end{pmatrix} - \begin{pmatrix} i_\alpha \\ i_\beta \end{pmatrix} \quad (5)$$

(d–q Axis Coordinate System)

$$\begin{pmatrix} v_d \\ v_q \end{pmatrix} = \begin{pmatrix} K_{pd} & 0 \\ 0 & K_{pq} \end{pmatrix} \left\{ \begin{pmatrix} i_{dr} \\ i_{qr} \end{pmatrix} - \begin{pmatrix} i_d \\ i_q \end{pmatrix} \right\} + \begin{pmatrix} K_{id} & 0 \\ 0 & K_{iq} \end{pmatrix} \begin{pmatrix} e_d \\ e_q \end{pmatrix} \quad (6)$$

$$\frac{d}{dt}\begin{pmatrix} e_d \\ e_q \end{pmatrix} = \begin{pmatrix} i_{dr} \\ i_{qr} \end{pmatrix} - \begin{pmatrix} i_d \\ i_q \end{pmatrix} \quad (7)$$

(e–f Axis Coordinate System)

$$\begin{pmatrix} v_e \\ v_f \end{pmatrix} = \begin{pmatrix} K_{pe} & 0 \\ 0 & K_{pf} \end{pmatrix} \left\{ \begin{pmatrix} i_{er} \\ i_{fr} \end{pmatrix} - \begin{pmatrix} i_e \\ i_f \end{pmatrix} \right\} + \begin{pmatrix} K_{ie} & 0 \\ 0 & K_{if} \end{pmatrix} \begin{pmatrix} e_e \\ e_f \end{pmatrix} \quad (8)$$

$$\frac{d}{dt}\begin{pmatrix} e_e \\ e_f \end{pmatrix} = \begin{pmatrix} i_{er} \\ i_{fr} \end{pmatrix} - \begin{pmatrix} i_e \\ i_f \end{pmatrix} \quad (9)$$

"Higher Harmonic Control in dq Axis Coordinate System (PI Control Over ef Axis Coordinate System in dq Axis Coordinate System)"

The dq axis coordinate system and the ef axis coordinate system have the relationships represented by Expressions (1) and (2). Considering a voltage v, a current i and an error integration value (see Expression (5)) e of the current as state quantities, they can be expressed as follows. It is to be noted that T'((n−1)θ) is a transposed matrix of T((n−1)θ) and the dq axis coordinate system advances by θ with respect to αβ. Therefore, a difference in order between the both coordinate systems is n−1.

$$\begin{pmatrix} v_d \\ v_q \end{pmatrix} = T'((n-1)\theta)\begin{pmatrix} v_e \\ v_f \end{pmatrix} \quad (10)$$

$$\begin{pmatrix} i_d \\ i_q \end{pmatrix} = T'((n-1)\theta)\begin{pmatrix} i_e \\ i_f \end{pmatrix} \quad (11)$$

$$\begin{pmatrix} e_d \\ e_q \end{pmatrix} = T'((n-1)\theta)\begin{pmatrix} e_e \\ e_f \end{pmatrix} \quad (12)$$

The PI control over the ef coordinate system represented by Expressions (8) and (9) is transformed into the dq axis coordinate system by utilizing Expressions (10) to (12).

$$\begin{pmatrix} v_d \\ v_q \end{pmatrix} = T'((n-1)\theta)\begin{pmatrix} K_{pe} & 0 \\ 0 & K_{pf} \end{pmatrix} T((n-1)\theta)\left\{\begin{pmatrix} i_{dr} \\ i_{qr} \end{pmatrix} - \begin{pmatrix} i_d \\ i_q \end{pmatrix}\right\} + \quad (14)$$

$$T'((n-1)\theta)\begin{pmatrix} K_{ie} & 0 \\ 0 & K_{if} \end{pmatrix} T((n-1)\theta)\begin{pmatrix} e_d \\ e_q \end{pmatrix} =$$

$$\begin{pmatrix} \frac{K_{pe}+K_{pf}}{2} + \frac{K_{pe}-K_{pf}}{2}\cos(2(n-1)\theta) & \frac{K_{pe}-K_{pf}}{2}\sin(2(n-1)\theta) \\ \frac{K_{pe}-K_{pf}}{2}\sin(2(n-1)\theta) & \frac{K_{pe}+K_{pf}}{2} - \frac{K_{pe}-K_{pf}}{2}\cos(2(n-1)\theta) \end{pmatrix}$$

$$\left\{\begin{pmatrix} i_{dr} \\ i_{qr} \end{pmatrix} - \begin{pmatrix} i_d \\ i_q \end{pmatrix}\right\} +$$

$$\begin{pmatrix} \frac{K_{ie}+K_{if}}{2} + \frac{K_{ie}-K_{if}}{2}\cos(2(n-1)\theta) & \frac{K_{ie}-K_{if}}{2}\sin(2(n-1)\theta) \\ \frac{K_{ie}-K_{if}}{2}\sin(2(n-1)\theta) & \frac{K_{ie}+K_{if}}{2} - \frac{K_{ie}-K_{if}}{2}\cos(2(n-1)\theta) \end{pmatrix}\begin{pmatrix} e_d \\ e_q \end{pmatrix}$$

$$\frac{d}{dt}\begin{pmatrix} e_d \\ e_q \end{pmatrix} = \quad (15)$$

$$\frac{d}{dt}\left\{T'((n-1)\theta)\begin{pmatrix} e_e \\ e_f \end{pmatrix}\right\} = \frac{d}{dt}\{T'((n-1)\theta)\}T((n-1)\theta)\begin{pmatrix} e_d \\ e_q \end{pmatrix} + T'((n-1)\theta)\frac{d}{dt}\begin{pmatrix} e_e \\ e_f \end{pmatrix} =$$

$$(n-1)\omega\begin{pmatrix} 0 & -1 \\ 1 & 0 \end{pmatrix}\begin{pmatrix} e_d \\ e_q \end{pmatrix} + T'((n-1)\theta)\left\{\begin{pmatrix} i_{er} \\ i_{fr} \end{pmatrix} - \begin{pmatrix} i_e \\ i_f \end{pmatrix}\right\} =$$

$$(n-1)\omega\begin{pmatrix} 0 & -1 \\ 1 & 0 \end{pmatrix}\begin{pmatrix} e_d \\ e_q \end{pmatrix} + \begin{pmatrix} i_{dr} \\ i_{qr} \end{pmatrix} - \begin{pmatrix} i_d \\ i_q \end{pmatrix}$$

Expression (15) can be converted into Expression (17). Additionally, assuming that $K_{pe}=K_{pf}$, $K_{ie}=K_{if}$, Expression (16) can be obtained by organizing the above expressions.

$$\begin{pmatrix} v_d \\ v_q \end{pmatrix} = K_{pe}\left\{ \begin{pmatrix} i_{dr} \\ i_{qr} \end{pmatrix} - \begin{pmatrix} i_d \\ i_q \end{pmatrix} \right\} + K_{ie}\begin{pmatrix} e_d \\ e_q \end{pmatrix} \quad (16)$$

$$\frac{d}{dt}\begin{pmatrix} e_d \\ e_q \end{pmatrix} = (n-1)\omega \begin{pmatrix} 0 & -1 \\ 1 & 0 \end{pmatrix}\begin{pmatrix} e_d \\ e_q \end{pmatrix} + \begin{pmatrix} i_{dr} \\ i_{qr} \end{pmatrix} - \begin{pmatrix} i_d \\ i_q \end{pmatrix} \quad (17)$$

Based on a current error $(i_{dr}-i_d, i_{qr}-i_q)$ in Expression (17), a transfer function of the integration value $(e_d, e_q)$ is represented by Expression (18).

$$F\left(\begin{pmatrix} e_d \\ e_q \end{pmatrix}\right) = \frac{1}{s^2 + \{(n-1)\omega\}^2}\begin{pmatrix} s & (n-1)\omega \\ -(n-1)\omega & s \end{pmatrix} F\left(\begin{pmatrix} i_{dr} \\ i_{qr} \end{pmatrix} - \begin{pmatrix} i_d \\ i_q \end{pmatrix}\right) \quad (18)$$

According to this expression, a diagonal component constitutes a band pass filter by which a pass band has a rotational frequency $\omega$, and a non-diagonal component constitutes a low pass filter by which a cutoff frequency has a rotational frequency $\omega$. Therefore, there is the possibility of robust properties with respect to the rotational frequency $\omega$, performing transformation as follows can be considered.

$$F\left(\begin{pmatrix} e_d \\ e_q \end{pmatrix}\right) = \frac{1}{s^2 + 2\zeta(n-1)\omega s + \{(n-1)\omega\}^2} \quad (19)$$

$$\begin{pmatrix} s + \zeta(n-1)\omega & (n-1)\omega \\ -(n-1)\omega & s + \zeta(n-1)\omega \end{pmatrix}$$

$$F\left(\begin{pmatrix} i_{dr} \\ i_{qr} \end{pmatrix} - \begin{pmatrix} i_d \\ i_q \end{pmatrix}\right)$$

In this expression, F( ) is a Laplace transform, s is a Laplace operator, and $\zeta$ is a constant corresponding to damping and $0<\zeta<0.7$ can be considered as an appropriate value.

$$\frac{d}{dt}\begin{pmatrix} e_d \\ e_q \end{pmatrix} = (n-1)\omega \begin{pmatrix} \frac{-\zeta}{(n-1)\omega} & -1 \\ 1 & \frac{-\zeta}{(n-1)\omega} \end{pmatrix}\begin{pmatrix} e_d \\ e_q \end{pmatrix} + \begin{pmatrix} i_{dr} \\ i_{qr} \end{pmatrix} - \begin{pmatrix} i_d \\ i_q \end{pmatrix} \quad (20)$$

Figure 2:
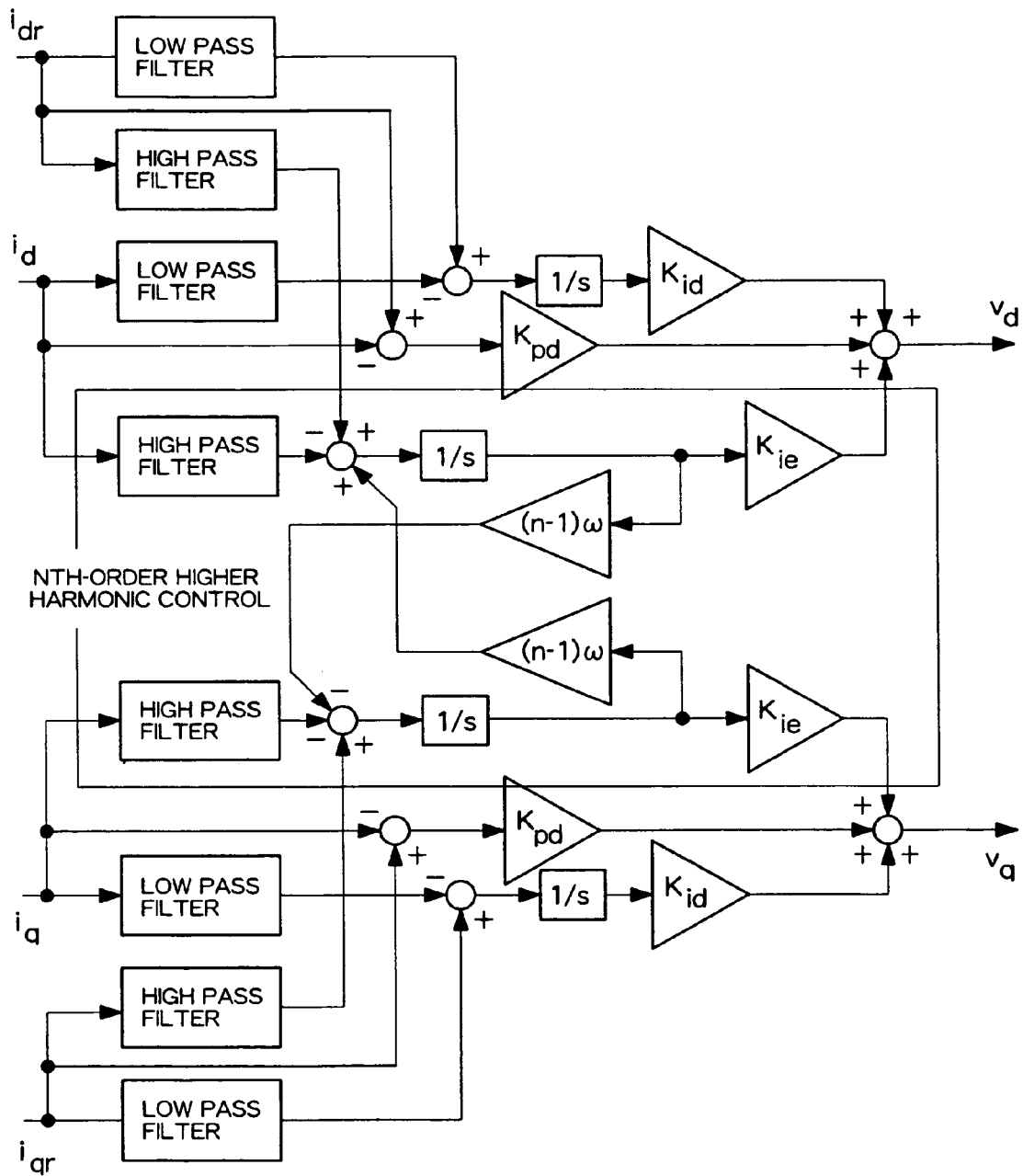
FIG. 2 is a view showing another configuration in the dq axis coordinate system for PI control over the nth-order higher harmonic wave.
Figure 3:
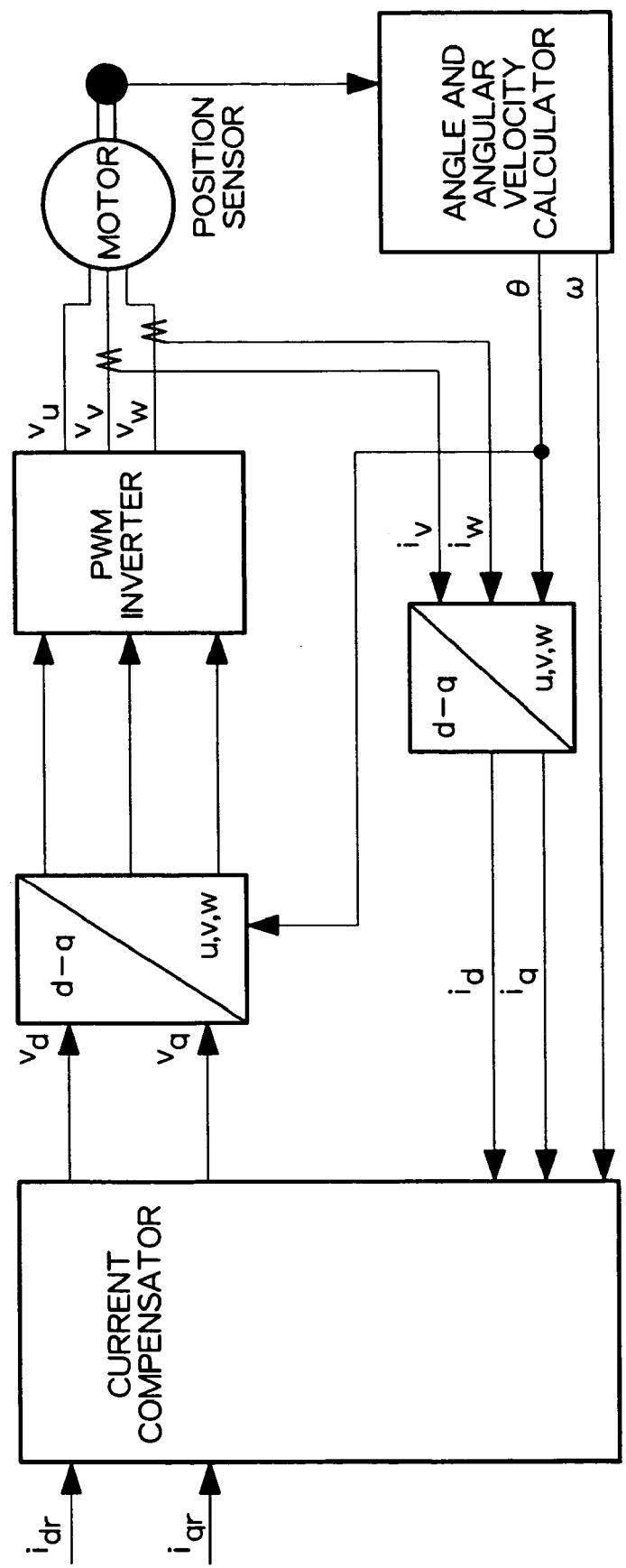
FIG. 3 is a view showing a structural example of a control system on a dq axis.

Assuming that the above-described control system is a control system for an nth-order higher harmonic wave (ef) and Expressions (6) and (7) are control systems for a fundamental wave (dq), a control system for the fundamental wave and the nth-order higher harmonic wave is as shown in FIG. 1 or 2. Further, a configuration which realizes this control system is shown in FIG. 3.

In FIG. 1, processing with respect to a signal which has been transmitted through a low pass filter in order to take out a fundamental wave component corresponds to fundamental wave processing, and processing with respect to a signal which has been transmitted through a high pass filter in order to take out an nth-order higher harmonic component corresponds to nth-order higher harmonic wave processing.

$i_{dr}$ and $i_d$, as well as $i_{qr}$ and $i_q$ of the fundamental wave transmitted through the low pass filter, are input to a subtracter where error values $(i_{dr}-i_d)$ and $(i_{qr}-i_q)$ are calculated. The obtained error values are each multiplied by $K_{pd}$, thereby calculating proportionals in the PI control over the fundamental wave. Furthermore, the error values $(i_{dr}-i_d)$ and $(i_{qr}-i_q)$ are subjected to integration (1/s) and then multiplied by $K_{id}$, thereby obtaining integration terms of the PI control. Furthermore, these results are added so that control voltages vd and vq of the fundamental wave can be obtained.

Moreover, $i_{dr}$ and $i_d$, as well as $i_{qr}$ and $i_q$ of the higher harmonic component transmitted through the high pass filter, are input to the subtracter where error values $(i_{dr}-i_d)$ and $(i_{qr}-i_q)$ are calculated. The obtained error values are multiplied by $K_p$, thereby calculating proportionals in the PI control over the fundamental wave. Additionally, the error values $(i_{dr}-i_d)$ and $(i_{qr}-i_q)$ are subjected to integration (1/s) and then multiplied by $K_{ie}$, thereby obtaining integration terms of the PI control. However, an adder (a subtracter) is provided before each integrator. The integration term of the d axis is multiplied by $(n-1)\omega$ and then subtracted from the error of the q axis, and an obtained result is input to the integrator of the q axis. The integration term of the q axis is multiplied by $(n-1)\omega$ and the added to the error of the d axis, and an obtained result is input to the integrator of the d axis. Consequently, the control represented by Expression (15) and the like can be executed.

With such a configuration, the proportionals and the integration terms of the nth-order higher harmonic wave can be obtained with respect to the d axis and the q axis, and the proportional and the integration term of the fundamental wave and the proportional and the integration term of the higher harmonic wave are added in the adders in accordance with the d axis and the q axis, thereby obtaining the control voltage vd of the d axis and the control voltage vq of the q axis.

In this manner, the PI control in the ef axis can be collectively performed as the control of dq. It is to be noted that $K_{pd}=K_{pq}$, $K_{id}=K_{iq}$, $K_{pe}=K_{pf}$ and $K_{ie}=K_{if}$ are determined in this example.

Figure 9:
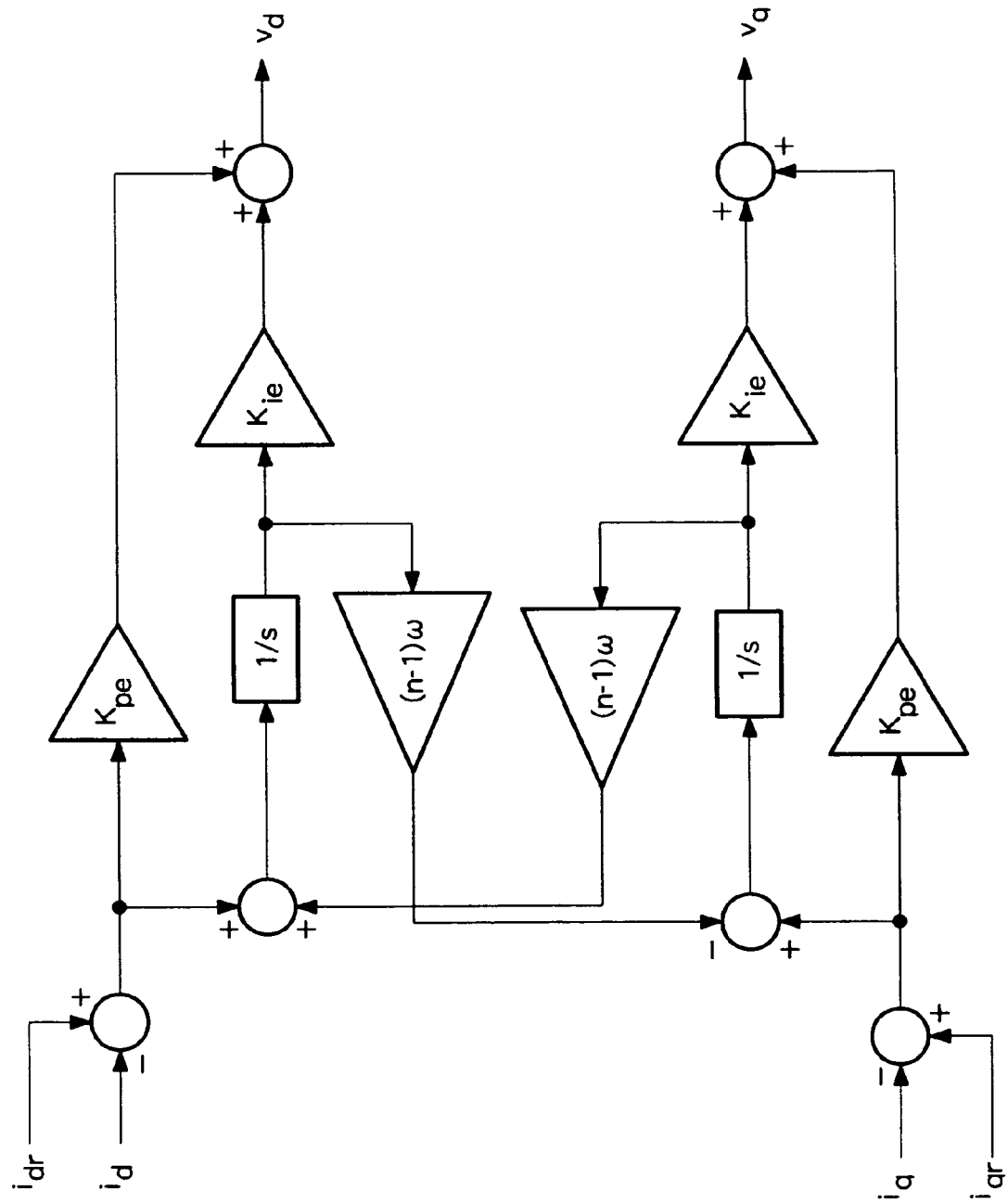
FIG. 9 is a view showing a configuration of a higher harmonic component in the coordinate system shown in FIG. 1.

FIG. 9 shows a processing part with respect to the higher harmonic wave in FIG. 1.

Further, in FIG. 2, a coefficient of proportional control is determined as $K_{pd}=K_{pe}$, and proportionals of the fundamental wave and the higher harmonic wave are altogether calculated. That is, $i_{dr}$ and $i_d$ of the d axis are added without using a filter, and an obtained result is multiplied by $K_{pd}$, thereby obtaining a proportional. Furthermore, $i_{qr}$ and $i_q$ of the q axis are added without using a filter, and an obtained result is multiplied by $K_{pd}$, thereby obtaining a proportional.

FIG. 3 shows the overall configuration of the system. The above-described configurations of FIGS. 1 and 2 are employed in a current compensator. This current compensator outputs vd and vq as voltage commands of the d axis and the q axis, and they are input to a dq/uvw converting section. The dq/uvw converting section converts the voltage command values of the dq axes into a switching command for an inverter which outputs each phase voltage driving voltage, and outputs the switching command. The switching command is input to a PWM inverter. Motor driving voltages $v_u$, $v_v$ and $v_w$ corresponding to vd and vq are supplied to respective phase coils of the three-phase motor 3 in accordance with the PWM inverter switching command.

On the other hand, a rotor rotating position of the motor is detected by a position sensor. The position sensor may be of a type which detects a change in any other motor current of a hall element. A detected value from the position sensor is input to an angle and angular velocity calculator where an angle θ and an angular velocity ω of the rotor are calculated from the rotor position detection result. This rotor angle θ is input to the uvw/dq converter. Motor currents having a v phase and a w phase (which may be any two phases or three phases) detected by the current detector are supplied to this uvw/dq converter where an exciting current id and a torque current iq in the dq axis coordinate system are calculated.

Moreover, id and iq from this uvw/dq converter and the angular velocity ω from the angle and angular velocity calculator are supplied to the current compensator. That is, a target value idr of the exciting current, a target value iqr of the torque current, and the detection results id, iq and ω are input to this current compensator, and hence vd and vq are calculated by such configurations as shown in FIGS. 1 and 2.

With such configurations, the motor driving control taking the higher harmonic wave into consideration can be executed without performing the coordinate transformation operation.

"dq Axis Current Control in αβ Coordinate System (PI Control Over dq Axis Coordinate System in αβ Coordinate System)"

When the PI control with the rotor fixed in the dq axis coordinate system is transformed into the αβ coordinate system with the stator fixed, the following expressions can be achieved.

$$\begin{pmatrix} v_\alpha \\ v_\beta \end{pmatrix} = \kappa_{pd} \left\{ \begin{pmatrix} i_{\alpha r} \\ i_{\beta r} \end{pmatrix} - \begin{pmatrix} i_\alpha \\ i_\beta \end{pmatrix} \right\} + \kappa_{id} \begin{pmatrix} e_\alpha \\ e_\beta \end{pmatrix} \quad (21)$$

$$\frac{d}{dt}\begin{pmatrix} e_\alpha \\ e_\beta \end{pmatrix} = \omega \begin{pmatrix} 0 & -1 \\ 1 & 0 \end{pmatrix}\begin{pmatrix} e_\alpha \\ e_\beta \end{pmatrix} + \begin{pmatrix} i_\alpha \\ i_{\beta r} \end{pmatrix} - \begin{pmatrix} i_\alpha \\ i_\beta \end{pmatrix} \quad (22)$$

They correspond to Expressions (16) and (17), a difference in order between the αβ coordinate system and the dq axis coordinate system is 1, and ω is adopted in place of (n−1)ω in Expression (17).

Figure 4:
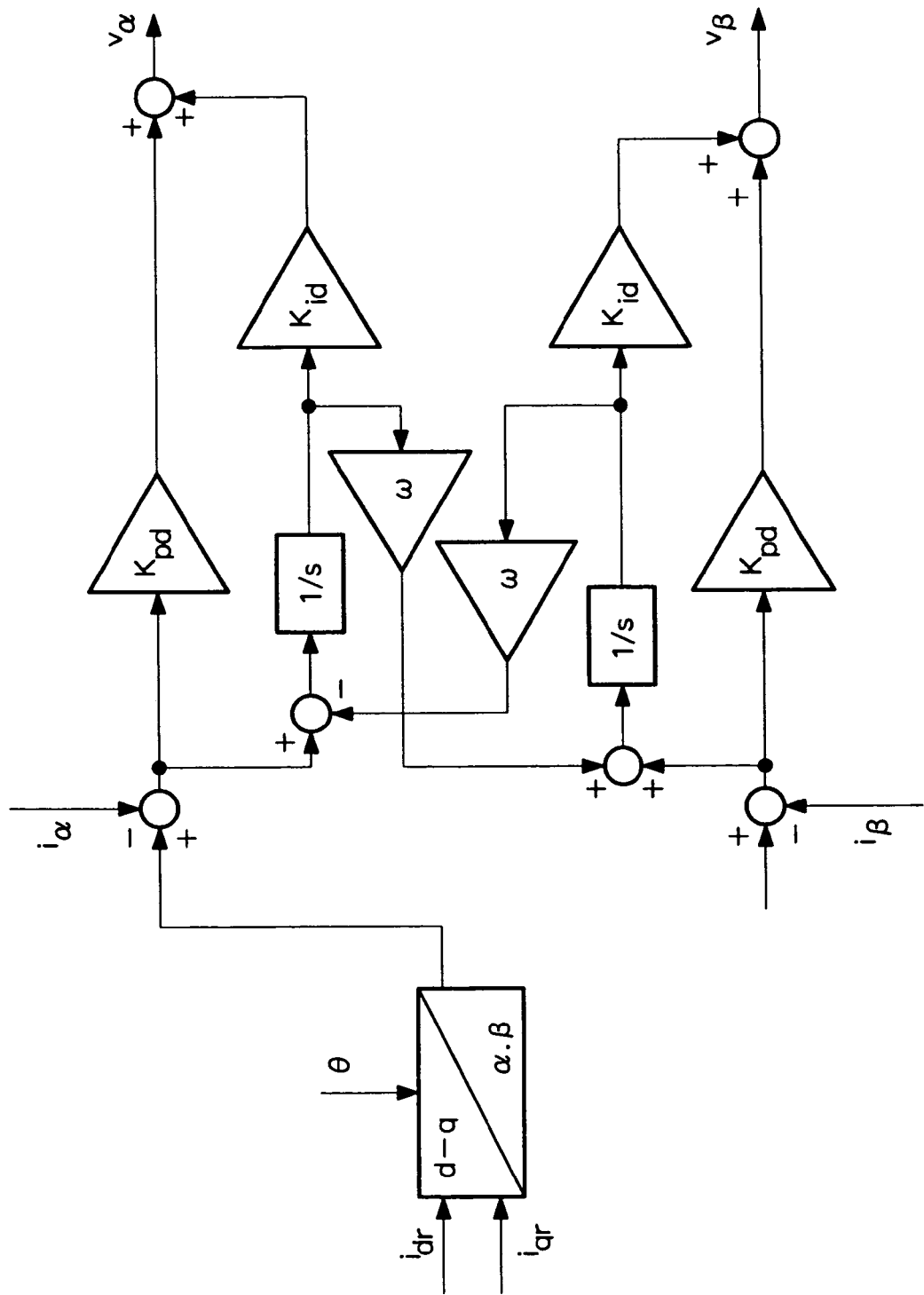
FIG. 4 is a view showing a configuration in an αβ coordinate system for PI control over a dq axis current.

Therefore, FIG. 4 shows a block diagram for this control. Exciting current and torque current commands (target values) $i_{dr}$ and $i_{qr}$ are input to the dq/αβ converter where these values are converted into iα$_r$ and iβ$_r$. It is to be noted that a rotor angle θ is required for this conversion, and this θ is also input to the dq/αβ converter.

iα$_r$ and iα, along with iβ$_r$ and iβ, are input to the subtracter where error values (iα$_r$−iα) and (iβ$_r$−iβ) are respectively calculated. The obtained error values are multiplied by $K_{pd}$, thereby calculating proportionals in the PI control of the fundamental wave. Additionally, the error values (iα$_r$−iα) and (iβ$_r$−iβ) are subjected to integration (1/s) and then multiplied by Kid, thereby obtaining integration terms of the PI control. However, an adder or a subtracter is provided before each integrator, and the integration term concerning the α axis is multiplied by ω and then added to the error of the β axis, and the obtained result is input to the integrator of the β axis. Further, the integration term concerning the α axis is multiplied by ω and then subtracted from the error of the β axis, and the obtained result is input to the integrator of the β axis. Consequently, the control represented by Expression (15) and the like can be executed.

With such a configuration, the proportional and the integration term of the PI control in the dq axis coordinate system can be obtained with respect to the αβ coordinate system, and the control voltage vα of the α axis and the control voltage vβ of the β axis an be obtained.

Figure 5:
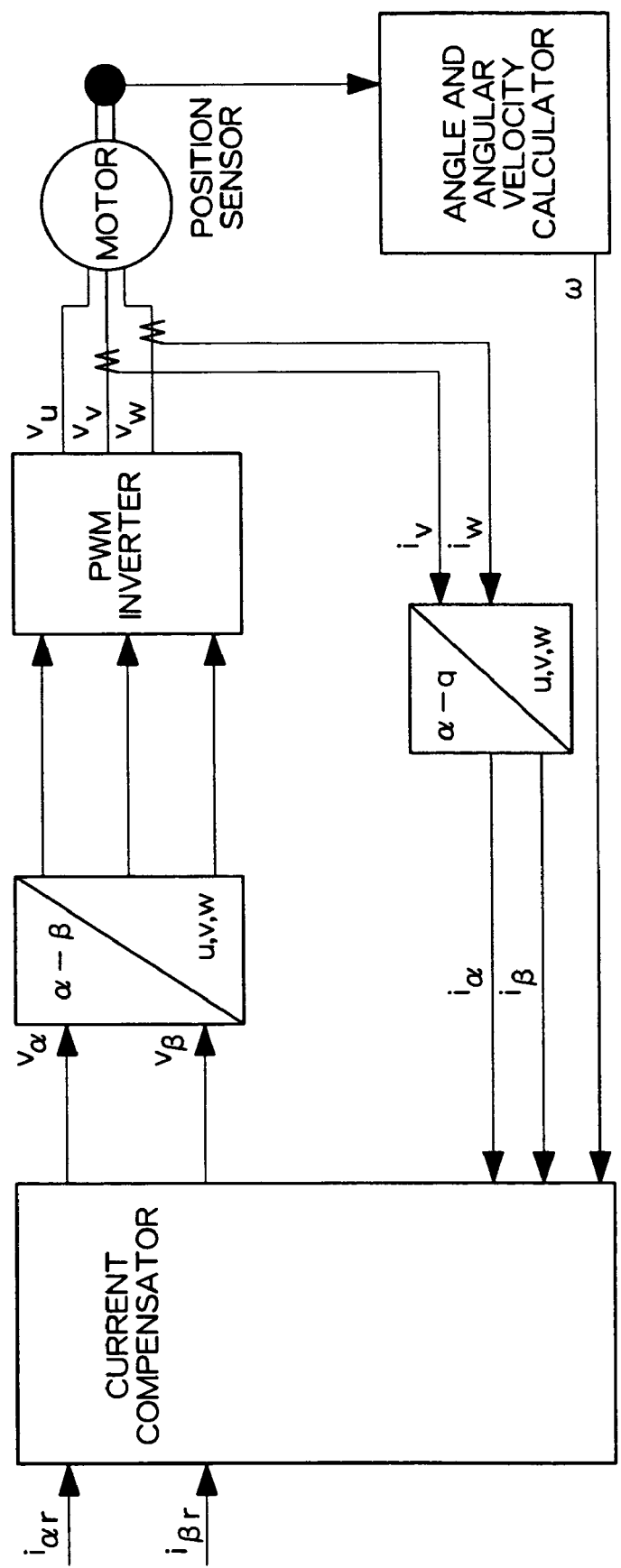
FIG. 5 is a view showing a structural example of a control system on αβ.

FIG. 5 shows the entire control system. This configuration is basically the same as that shown in FIG. 3. iα$_r$, iβ$_r$, iα, iβ and ω are input to the current compensator, and vα and vβ are obtained by the configuration shown in FIG. 4. vα and vβ are input to the αβ/uvw converter where commands of respective phases u, v and w are created, and the motor is thereby driven. Furthermore, motor currents iv and i$_w$ are converted into iα and iβ in the uvw/αβ converter.

In this manner, the PI control in the dq axis coordinate system can be realized in the αβ coordinate system. "Higher Harmonic Control Method in dq Coordinate System (General Filter of ef Coordinate System in dq Coordinate System)"

In the above, an example in which the PI control (the control which calculates proportionals and integration terms of errors) in the ef axis coordinate system is carried out in the dq axis coordinate system was described. Next, an example which realizes in the dq axis coordinate system a general filter in the ef coordinate system (the coordinate system of n rotations) will be described.

It is to be noted that although in the following description the order of the filter is the fourth order, the order of the filter can be readily extended to the sixth order, the eighth order, etc. It is to be noted that m=n−1 is determined.

First, transformation into the dq axis coordinate system by the fourth-order filter corresponding to Expressions (10) to (12) can be represented as follows.

$$\begin{pmatrix} v_d \\ v_q \end{pmatrix} = T'(m\theta)\begin{pmatrix} v_e \\ v_f \end{pmatrix} \quad (23)$$

$$\begin{pmatrix} i_d \\ i_q \end{pmatrix} = T'(m\theta)\begin{pmatrix} i_e \\ i_f \end{pmatrix} \quad (24)$$

$$\begin{pmatrix} e_d \\ e_q \end{pmatrix} = T'(m\theta)\begin{pmatrix} e_e \\ e_f \end{pmatrix} \quad (25)$$

$$\begin{pmatrix} i_r \\ i_s \end{pmatrix} = T'(m\theta)\begin{pmatrix} i_g \\ i_h \end{pmatrix} \quad (26)$$

$$\begin{pmatrix} e_r \\ e_s \end{pmatrix} = T'(m\theta)\begin{pmatrix} e_g \\ e_h \end{pmatrix} \quad (27)$$

On the other hand, the fourth-order filter in the ef axis coordinate system can be represented as follows.

$$\begin{pmatrix} v_e \\ v_f \end{pmatrix} = \kappa_p \left\{ \begin{pmatrix} i_{er} \\ i_{fr} \end{pmatrix} - \begin{pmatrix} i_e \\ i_f \end{pmatrix} \right\} + \kappa_i \begin{pmatrix} e_e \\ e_f \\ e_g \\ e_h \end{pmatrix} \quad (29)$$

$$\frac{d}{dt}\begin{pmatrix} e_e \\ e_f \\ e_g \\ e_h \end{pmatrix} = B\left\{ \begin{pmatrix} i_{er} \\ i_{fr} \end{pmatrix} - \begin{pmatrix} i_e \\ i_f \end{pmatrix} \right\} + A\begin{pmatrix} e_e \\ e_f \\ e_g \\ e_h \end{pmatrix} \quad (30)$$

The general filter of the ef coordinate system represented by Expressions (29) and (30) is transformed into the dq coordinate system. In this transformation, φ2×2 is a zero matrix of two rows and two columns.

$$\begin{pmatrix} v_d \\ v_q \end{pmatrix} = T'(m\theta)\kappa_p T(m\theta) \left\{ \begin{pmatrix} i_{dr} \\ i_{qr} \end{pmatrix} - \begin{pmatrix} i_d \\ i_q \end{pmatrix} \right\} +$$
$$T'(m\theta)\kappa_i \begin{pmatrix} T(m\theta) & \phi_{2\times2} \\ \phi_{2\times2} & T(m\theta) \end{pmatrix} \begin{pmatrix} e_d \\ e_q \\ e_r \\ e_s \end{pmatrix} \quad (31)$$

$$\frac{d}{dt} \begin{pmatrix} e_d \\ e_q \\ e_r \\ e_s \end{pmatrix} = \frac{d}{dt} \left\{ \begin{pmatrix} T'(m\theta) & \phi_{2\times2} \\ \phi_{2\times2} & T'(m\theta) \end{pmatrix} \begin{pmatrix} e_e \\ e_f \\ e_g \\ e_h \end{pmatrix} \right\} \quad (32)$$

$$= \frac{d}{dt} \left\{ \begin{pmatrix} T'(m\theta) & \phi_{2\times2} \\ \phi_{2\times2} & T'(m\theta) \end{pmatrix} \begin{pmatrix} T(m\theta) & \phi_{2\times2} \\ \phi_{2\times2} & T(m\theta) \end{pmatrix} \begin{pmatrix} e_d \\ e_q \\ e_r \\ e_s \end{pmatrix} \right\} +$$

$$\begin{pmatrix} T'(m\theta) & \phi_{2\times2} \\ \phi_{2\times2} & T'(m\theta) \end{pmatrix} \frac{d}{dt} \begin{pmatrix} e_e \\ e_f \\ e_g \\ e_h \end{pmatrix}$$

$$= \frac{d}{dt} \left\{ \begin{pmatrix} T'(m\theta) & \phi_{2\times2} \\ \phi_{2\times2} & T'(m\theta) \end{pmatrix} \begin{pmatrix} T(m\theta) & \phi_{2\times2} \\ \phi_{2\times2} & T(m\theta) \end{pmatrix} \begin{pmatrix} e_d \\ e_q \\ e_r \\ e_s \end{pmatrix} \right\} +$$

$$\begin{pmatrix} T'(m\theta) & \phi_{2\times2} \\ \phi_{2\times2} & T'(m\theta) \end{pmatrix} \left[ B \left\{ \begin{pmatrix} i_{er} \\ i_{fr} \end{pmatrix} - \begin{pmatrix} i_e \\ i_f \end{pmatrix} \right\} + A \begin{pmatrix} e_e \\ e_f \\ e_g \\ e_h \end{pmatrix} \right]$$

$$= \frac{d\theta}{dt} \begin{pmatrix} \begin{pmatrix} 0 & -1 \\ 1 & 0 \end{pmatrix} & \phi_{2\times2} \\ \phi_{2\times2} & \begin{pmatrix} 0 & -1 \\ 1 & 0 \end{pmatrix} \end{pmatrix} \begin{pmatrix} e_d \\ e_q \\ e_r \\ e_s \end{pmatrix} +$$

$$\begin{pmatrix} T'(m\theta) & \phi_{2\times2} \\ \phi_{2\times2} & T'(m\theta) \end{pmatrix} BT(m\theta) \left\{ \begin{pmatrix} i_{dr} \\ i_{qr} \end{pmatrix} - \begin{pmatrix} i_d \\ i_q \end{pmatrix} \right\} +$$

$$\begin{pmatrix} T'(m\theta) & \phi_{2\times2} \\ \phi_{2\times2} & T'(m\theta) \end{pmatrix} A \begin{pmatrix} T(m\theta) & \phi_{2\times2} \\ \phi_{2\times2} & T(m\theta) \end{pmatrix} \begin{pmatrix} e_d \\ e_q \\ e_r \\ e_s \end{pmatrix}$$

In Expression (32), the first term in the right side member is a part corresponding to an interference of the integration term, and the second and third terms are a part corresponding to the regular filter. That is, in case of the above-described PI control, this corresponds to a part where (n−1)ω is multiplied and a result is added to or subtracted from an error of the other axis. As described above, in this example, since the first term in the right side member exists, the appropriate control can be achieved in cases where the nth-order filter is realized in the dq axis coordinate system.

Moreover, in this example, the filter on the ef axis coordinate system is realized on the dq axis coordinate system. However, the filter on one coordinate system can be realized with another coordinate by the same technique.

"Simulation Example"

Figure 7:
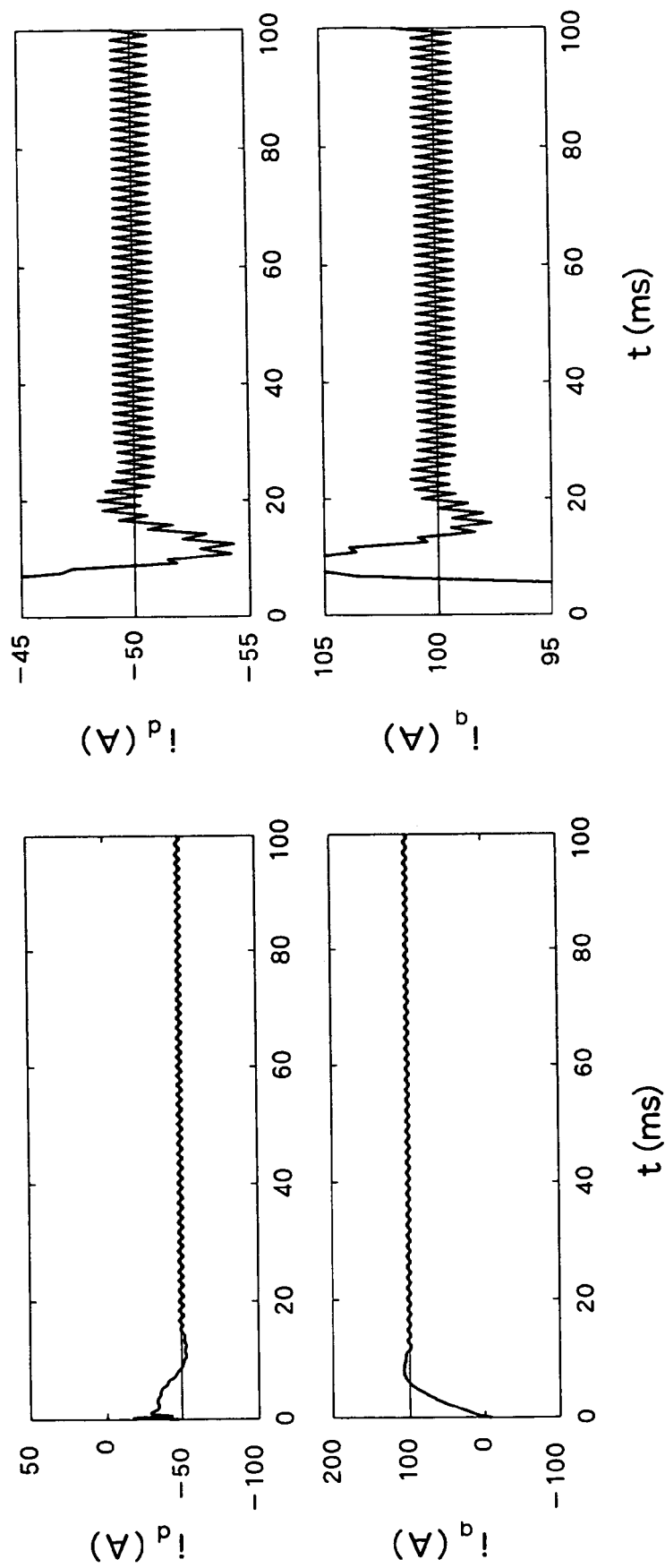
FIG. 7 is a view showing a change in a motor current caused by a technique with the dq axis prepared for each higher harmonic wave.
Figure 8:
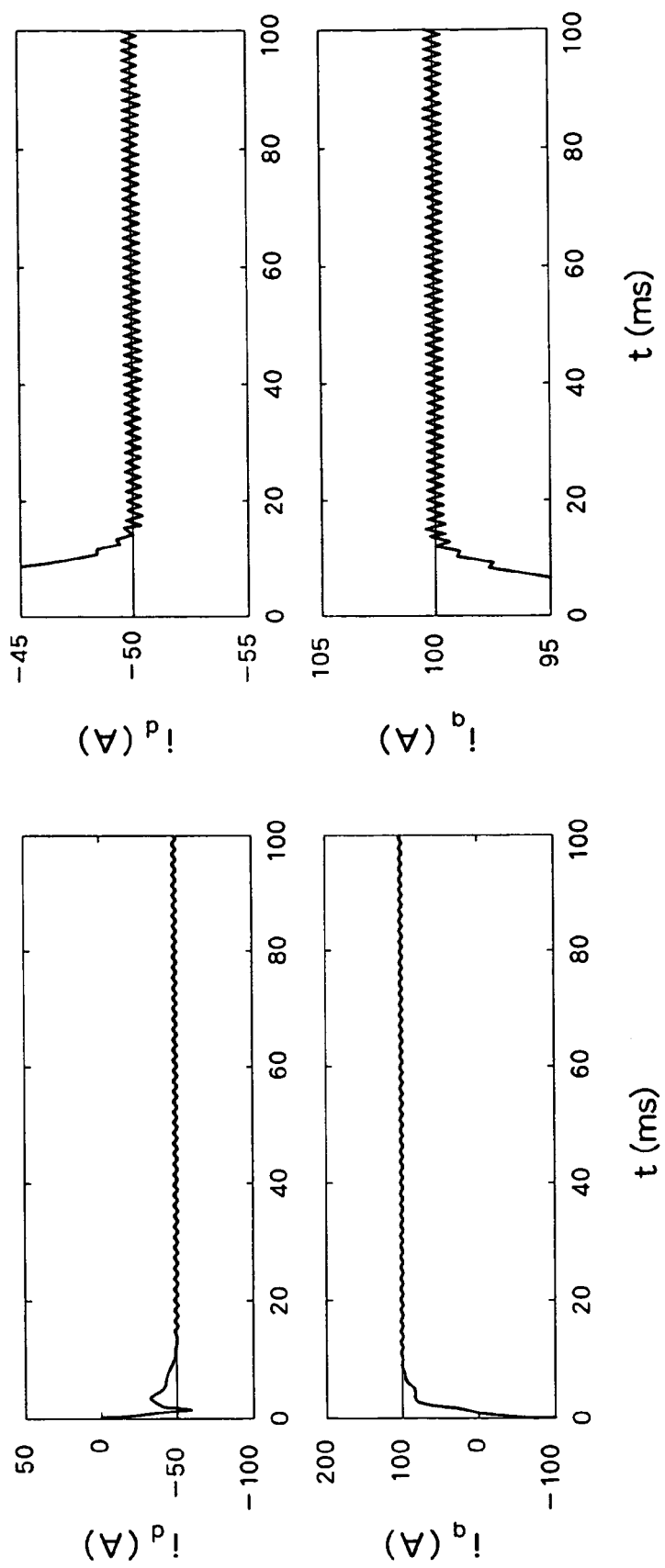
FIG. 8 is a view showing a change in a motor current caused by a technique according to the embodiment which realizes on the dq axis the control on an ef axis (n=6)

A simulation result when the sixth-order higher harmonic wave is applied to a back electromotive force in a motor voltage equation represented by the dq axes will now be described with reference to FIGS. 6 to 8. In these drawings, the top portion represents an axis current, the lower portion represents an axis current, and the right side is an expanded view of the left side.

Figure 6:
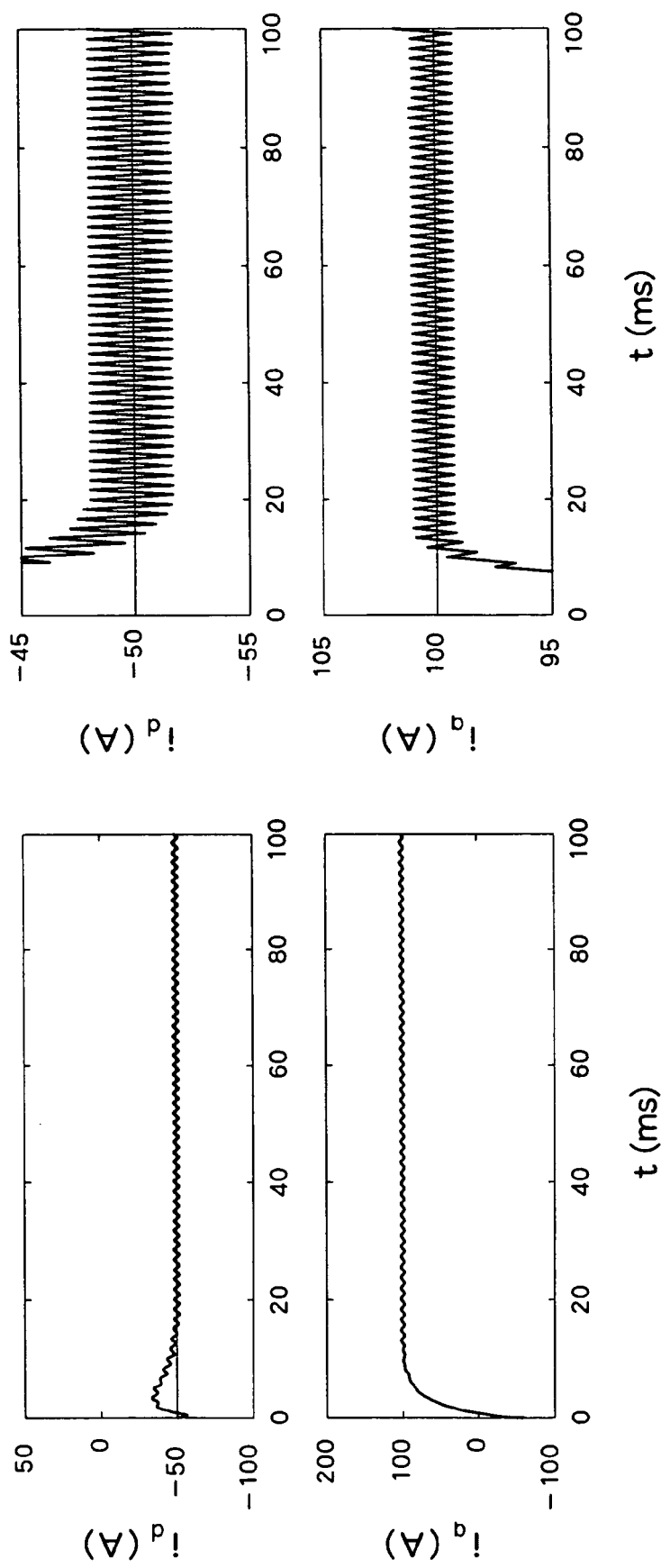
FIG. 6 is a view showing a change in a motor current on the dq axis caused by a conventional technique.

FIG. 6 shows a conventional technique by which the PI control is executed with respect to a fundamental wave in the dq axes, and it can be understood that a higher harmonic component cannot be suppressed. FIG. 7 shows a technique by which the dq axes are prepared in accordance with each higher harmonic wave, and FIG. 8 shows a technique according to this embodiment which also performs the control over a higher harmonic wave having a frequency six times that of a rotor as the control of the dq axis coordinate system, in which the control technique itself is transformed into the dq axis coordinate system. As described above, it can be understood that the technique according to this embodiment or the method which prepares the coordinate system in accordance with each higher harmonic wave can suppress a harmonic wave six times greater than possible with the conventional method.

As described above, according to this embodiment, the PI control in the ef coordinate system which realizes a rotational frequency which is n times that of the rotor can be carried out for control in a dq axis coordinate system. Further, the nth-order filter in one coordinate system can be handled as a filter on any other coordinate system which relatively rotates with respect to the former coordinate. Therefore, in the motor driving control, the control taking a higher harmonic wave or the like into consideration can be achieved without performing coordinate transformation of all variables each time.

What is claimed is:

1. A method of controlling an alternating-current motor including a rotor and a stator, wherein
in one coordinate system of arbitrary rectangular coordinate systems including a coordinate system fixed to the stator, a coordinate system fixed to the rotor, and a coordinate system which rotates at a rotational frequency which is n times (n is an integer which is not 0 or 1) that of the rotor, defining a filter on any other coordinate system, and controlling driving of the motor by utilizing the filter.

2. A method of controlling an alternating-current motor including a rotor and a stator, the method comprising:
obtaining via a first device a current control output which controls a fundamental wave component of a motor current in an axis coordinate system which rotates in synchronization with the rotor with respect to a d axis current which is mainly an exciting current component of a phase current of the alternating-current motor and a q axis current which is mainly a torque current component of the same;
controlling via a second device an e axis current and an f axis current, the e axis current and the f axis current having a frequency which is an integer multiple of a frequency of the fundamental wave component of the alternating-current motor, and realizing via the second device the e and f axes current controls on the d axis current control and the q axis current control; and
adding an output from the first device and an output from the second device, and outputting a motor driving current, wherein PI control in the second device is also executed as current control on the d and q axes.

3. The method according to claim 2, wherein the step of controlling via the second device comprises:
performing via a third device subtraction or addition with respect to a constant multiple of an output from an f axis current error integration controller and an e axis current error;
performing via a fourth device addition or subtraction with respect to a constant multiple of an output from an e axis current error integration controller and the e axis current error;
subjecting an output from the third device to proportional multiplication via an e axis current error proportional controller;
subjecting an output from the fourth device to proportional multiplication via an f axis current error proportional controller;
adding a constant multiple of the e axis current error and an output from the e axis current error proportional controller;
adding a constant multiple of the f axis current error and an output from the f axis current error proportional controller;
subjecting an output from the third device to integration via the e axis current error integration controller; and
subjecting an output from the fourth device to integration and proportional multiplication via the f axis current error integration controller.

4. The method according to claim 3, wherein the constants are the same value and the value is a product of n−1 and a rotation angular velocity based on an electrical angle,
wherein n is a rotation order of the e and f axes which rotate at a rotation frequency which is n times that of the d and q axes, wherein n is an integer which is not 0 or 1.

5. The method according to claim 2, wherein the step of realizing via the second device further comprises, realizing on the d and q axes PI control on the e and f axes by utilizing expressions obtained by transforming expressions of the PI control on the e and f axes into expressions on the d and q axes.

6. A method of controlling current by separating an $\alpha$ phase current and a $\beta$ phase current as current components of axes which are fixed to a stator and orthogonal to each other with respect to an alternating-current motor including a rotor and the stator, and controlling the respective phase currents based on an $\alpha$ phase current error and a $\beta$ phase current error which are errors from command values of motor currents of the $\alpha$ phase current and the $\beta$ phase current, the method comprising:
multiplying the $\alpha$ phase current error by a predetermined proportional coefficient to obtain an $\alpha$ phase proportional control component;
integrating via a first device a difference value between the $\alpha$ phase current error and a coefficient multiple based on a rotational frequency of the rotor as an output from a second device;
integrating via the second device an added value of the $\beta$ phase current error and a coefficient multiple based on a rotational frequency as an output from the first device;
adding an $\alpha$ phase integration control component obtained by multiplying an output from the first device by a predetermined proportional coefficient and the $\alpha$ phase proportional control component, and outputting an $\alpha$ phase voltage command;
adding a $\beta$ phase integration control component obtained by multiplying an output from the second device by a predetermined proportional coefficient and a $\beta$ phase proportional control component as an output from a $\beta$ phase proportional unit, and outputting a $\beta$ phase voltage command; and
driving the alternating-current motor based on the $\alpha$ phase voltage command and the $\beta$ phase voltage command.

* * * * *